(12) United States Patent
Arimanda et al.

(10) Patent No.: US 12,289,347 B2
(45) Date of Patent: Apr. 29, 2025

(54) ADJUSTING A SECURITY POLICY BASED ON SYSTEM RESOURCE UTILIZATION

(71) Applicant: Juniper Networks, Inc., Sunnyvale, CA (US)

(72) Inventors: Sravanthi Arimanda, Bangalore (IN); Hari Prasad S R, Karnataka (IN)

(73) Assignee: Juniper Networks, Inc., Sunnyvale, CA (US)

( * ) Notice: Subject to any disclaimer, the term of this patent is extended or adjusted under 35 U.S.C. 154(b) by 253 days.

(21) Appl. No.: 17/809,407

(22) Filed: Jun. 28, 2022

(65) Prior Publication Data
US 2023/0421614 A1    Dec. 28, 2023

(51) Int. Cl.
*H04L 9/40*    (2022.01)

(52) U.S. Cl.
CPC .................. *H04L 63/205* (2013.01)

(58) Field of Classification Search
USPC ............................................ 726/1
See application file for complete search history.

(56) References Cited

U.S. PATENT DOCUMENTS

| 7,546,629 | B2  |   | 6/2009  | Albert et al. |            |
|-----------|-----|---|---------|---------------|------------|
| 8,612,612 | B1  | * | 12/2013 | Dukes         | H04L 67/141|
|           |     |   |         |               | 709/203    |
| 2010/0188990 | A1 |   | 7/2010 | Raleigh       |            |
| 2014/0250491 | A1 | * | 9/2014 | Fleischman    | H04L 63/06 |
|           |     |   |         |               | 726/1      |
| 2016/0373474 | A1 | * | 12/2016 | Sood         | G06F 21/53 |
| 2019/0132353 | A1 | * | 5/2019 | Rodniansky    | H04L 67/561|
| 2020/0028822 | A1 |   | 1/2020 | Reddy et al.  |            |
| 2020/0296136 | A1 | * | 9/2020 | Liu           | H04L 63/02 |

FOREIGN PATENT DOCUMENTS

CN          108768879 B          4/2022

OTHER PUBLICATIONS

Chenghua Tang et al, "A Network Security Policy Model and Its Realization Mechanism," Inscrypt (formerly CISC) 2006, 2nd SKLOIS Conference on Information Security and Cryptology, Chinese Academy of Sciences, Beijing, China, pp. 168-181, 2006.
Extended European Search Report for Application No. EP22190536.7, mailed on Feb. 17, 2023, 10 pages.

* cited by examiner

*Primary Examiner* — Sanchit K Sarker
(74) *Attorney, Agent, or Firm* — Harrity & Harrity, LLP (57) ABSTRACT

In some implementations, a security device may identify a resource profile based on a value of a resource utilization metric associated with the security device. The security device may identify a security services profile to be applied to traffic that is to be processed by the security device. The security device may determine a set of security services to be performed by the security device, the set of security services being identified based on the resource profile and the security services profile. The security device may perform the set of security services according to the security services profile.

20 Claims, 5 Drawing Sheets

ADJUSTING A SECURITY POLICY BASED ON SYSTEM RESOURCE UTILIZATION

BACKGROUND

A security device may be configured to apply a security policy that defines one or more security services to be performed for traffic being communicated in a network. Such security services may include, for example, an intrusion detection and prevention (IDP) service, a unified threat management (UTM) service, an advanced-anti-malware (AAMW) service, a deep packet inspection (DPI) service, or a domain name system filter (DNSF) service, among other examples.

SUMMARY

Some aspects described herein relate to a method. The method may include identifying, by a security device, a resource profile based on a value of a resource utilization metric associated with the security device. The method may include identifying, by the security device, a security services profile to be applied to traffic that is to be processed by the security device. The method may include determining, by the security device, a set of security services to be performed by the security device, the set of security services being identified based on the resource profile and the security services profile. The method may include performing, by the security device, the set of security services according to the security services profile.

Some aspects described herein relate to a security device. The security device may include a memory and one or more processors coupled to the memory. The one or more processors may be configured to identify a resource profile based on a value of a resource utilization metric associated with the security device. The one or more processors may be configured to identify a set of security services to be performed by the security device, the set of security services being identified based on the resource profile. The one or more processors may be configured to perform the identified set of security services, the set of security services being performed according to a security services profile that is to be applied to traffic that is to be processed by the security device.

Some aspects described herein relate to a non-transitory computer-readable medium that stores a set of instructions by a device. The set of instructions, when executed by one or more processors of the device, may cause the device to identify a resource profile based on a value of a resource utilization metric associated with the device. The set of instructions, when executed by one or more processors of the device, may cause the device to identify a services profile to be applied to traffic that is to be processed by the device. The set of instructions, when executed by one or more processors of the device, may cause the device to determine a set of services to be performed by the device, the set of services being identified based on the resource profile and the services profile. The set of instructions, when executed by one or more processors of the device, may cause the device to perform the set of services according to the services profile.

DETAILED DESCRIPTION

The following detailed description of example implementations refers to the accompanying drawings. The same reference numbers in different drawings may identify the same or similar elements.

A security device may be configured to apply a security policy that defines one or more security services (e.g., an IDP service, a UTM service, an AAMW service, a DPI service, a DNSF service, or the like) to be performed for traffic being communicated in a network. However, in some scenarios, the security device may have insufficient resources to implement the security policy. For example, if multiple security services are enabled in a given security policy and the security device is under a relatively heavy traffic load, then the security device may have insufficient resources (e.g., memory resources, processing resources, or the like) to fully perform the multiple security services on all traffic. In practice, such a lack of sufficient resources for performing security services can result in either traffic being dropped, in which case network availability is reduced, or traffic bypassing one or more security services, in which case security of the network is compromised.

Some aspects described herein provide techniques and apparatuses for adjusting a security policy based on system resource utilization. In some implementations, a security device may identify a resource profile based on a value of a resource utilization metric associated with the security device, and may identify a security services profile to be applied to traffic that is to be processed by the security device. The security device may determine a set of security services to be performed by the security device, where the set of security services is identified based on the resource profile and the security services profile. The security device may then perform the set of security services according to the security services profile. Additional details are provided below.

In this way, a security policy can be dynamically adapted based on resources available to the security device for performing one or more security services. As a result, a degree to which network availability or security service bypassing occurs due to limited security device resources can be configured or controlled (e.g., as desired by a network operator), which can provide improved network security and/or network availability in a given scenario.

Figure 1:
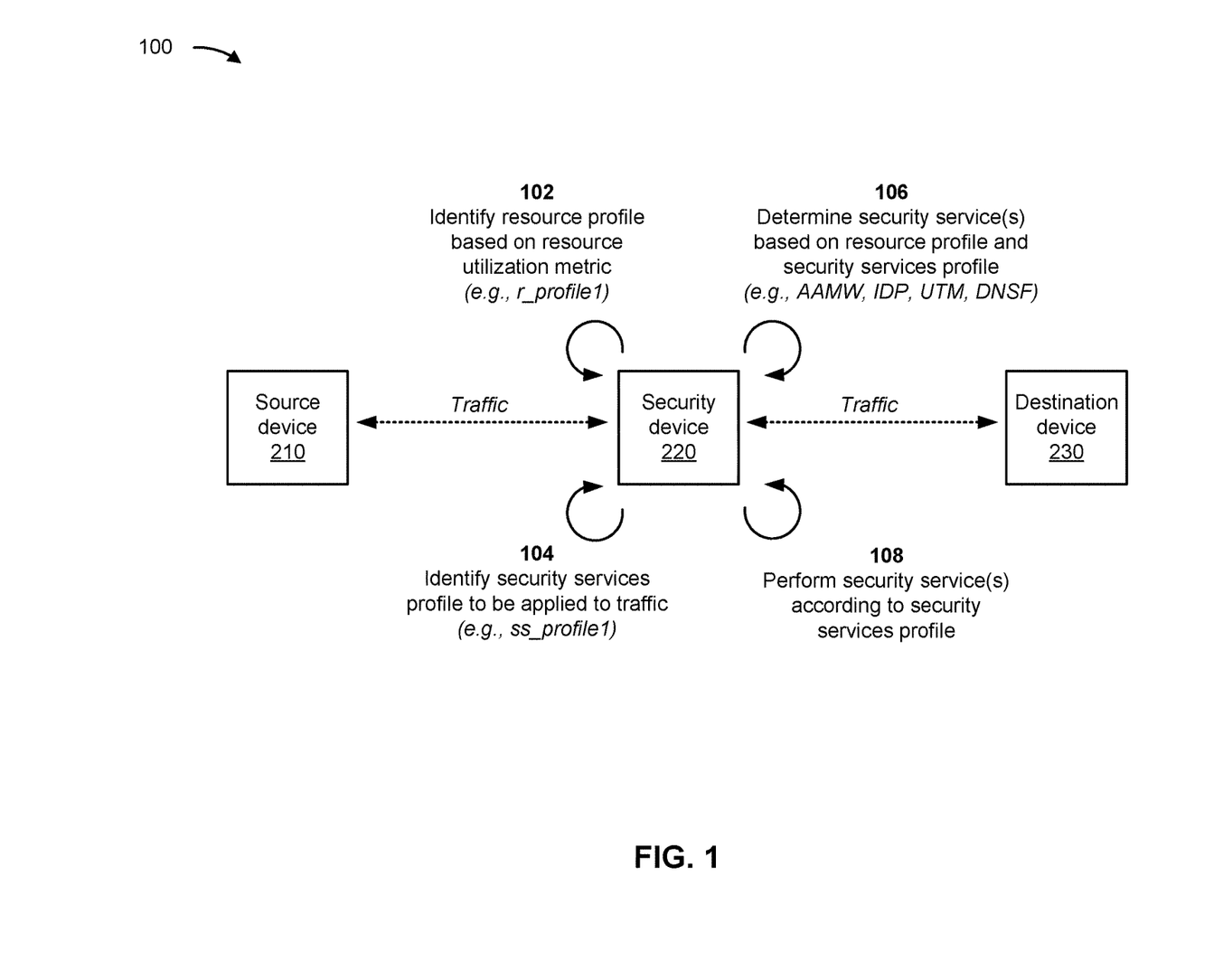
FIG. 1 is a diagram of an example implementation associated with adjusting a security policy based on system resource utilization.

FIG. 1 is a diagram of an example implementation 100 associated with adjusting a security policy based on system resource utilization. As shown in FIG. 1, example implementation 100 includes a source device 210, a security device 220, and a destination device 230. These devices are described in more detail below in connection with FIGS. 2-4.

As shown in FIG. 1 by reference 102, the security device 220 may identify a resource profile based on a value of a resource utilization metric associated with the security device 220.

A resource utilization metric is a metric that indicates a utilization of a resource that is accessible by the security device 220 in association with performing one or more security services. For example, the resource utilization metric may be a memory utilization metric. The memory utilization metric may indicate, for example, a percentage of a memory resource, accessible by the security device 220, that is in use or is otherwise unavailable to the security device 220 at a given time. That is, the memory utilization metric may in some implementations indicate an amount of memory, accessible by the security device 220, that is currently unavailable to the security device 220 for use in association with performing one or more security services. As another example, the resource utilization metric may be a processing resource utilization metric. The processing resource utilization metric may indicate, for example, a percentage of a processor resource (e.g., central processing unit (CPU) resources), accessible by the security device 220, that is in use or is otherwise unavailable to the security device 220 at a given time. That is, the processing resource utilization metric may in some implementations indicate an amount of processing resources, accessible by the security device 220, that is currently unavailable for use in association with performing one or more security services. Additionally, or alternatively, a given resource utilization metric may indicate an amount (e.g., a percentage) of a resource, accessible by the security device 220, that is available to the security device 220 for use in association with performing one or more security services at a given time (rather than indicating an amount of the resource that is unavailable).

In some implementations, the security device 220 may determine values for one or more resource utilization metrics. For example, the security device 220 may determine a value of a memory resource utilization metric at a given time and may determine a value of a processing resource utilization metric at the given time. In some implementations, the security device 220 may use values of one or more resource utilization metrics to identify a resource profile applicable to the security device 220 at the given time. In some implementations, the security device 220 may determine the values for the one or more resource utilization metrics for a traffic flow when traffic associated with the traffic flow is received by the security device 220 (e.g., when the security device 220 first receives traffic associated with the traffic flow). Thus, in some implementations, the security device 220 determines the values for the one or more resource utilization metrics based on receiving traffic associated with the traffic flow. For example, the security device 220 may receive traffic associated with a traffic flow at a given time, with the traffic being the first traffic associated with the traffic flow that is received by the security device 220. Here, the security device 220 may determine the values for the one or more resource utilization metrics (e.g., a current status of resource utilization of the security device 220) based on receiving the first traffic associated with the traffic flow.

A resource profile is a profile that can be used by the security device 220 to identify one or more security services to be performed by the security device 220 for a given traffic flow. In some implementations, the security device 220 may determine the resource profile based on values of one or more resource utilization metrics. In some implementations, a resource profile indicates one or more resource utilization thresholds or one or more ranges of resource utilization based on which the security device 220 can identify the one or more security services. For example, a first resource profile (e.g., r_profile1) may identify a memory utilization threshold of 75%, a second resource profile (e.g., r_profile2) may identify a memory utilization threshold of 80%, and a third resource profile (e.g., r_profile3) may identify a memory utilization threshold of 85%. Here, the security device 220 may identify the first resource profile as applicable to the security device 220 when a value for a memory utilization metric is greater than 75% and less than or equal to 80%. Similarly, the security device 220 may identify the second resource profile as applicable to the security device 220 when the value for the memory utilization metric is greater than 80% and less than or equal to 85%. Further, the security device 220 may identify the third resource profile as applicable to the security device 220 when the value for the memory utilization metric is greater than 85%.

In some implementations, the resource profile identified by the security device 220 may be a default resource profile. Continuing with the above example, the security device 220 may determine that the value of the memory utilization metric is less than 75% (i.e., that the value of the memory utilization metric does not fall within resource utilization ranges defined by the first through third resource profiles). In this example, because the value of the resource utilization metric does not indicate that a particular resource profile is applicable, the security device 220 may identify the resource profile as a default resource profile (e.g., r_profiledefault). Thus, in some implementations, the default resource profile is a resource profile that is used when the value of the resource utilization metric does not fall within resource utilization ranges specified by a set of resource profiles.

In some implementations, a resource profile may be associated with one or more resource utilization metrics. For example, a resource profile may be associated with a memory utilization threshold and a processing resource utilization threshold. As a particular example, a first resource profile may identify a memory utilization threshold of 75% and a processing resource utilization threshold of 80%, a second resource profile may identify a memory utilization threshold of 75% and a processing resource utilization of 80%, a third resource profile may identify a memory utilization threshold of 90% and a processing resource utilization threshold of 75%, and a fourth resource profile may identify a memory utilization threshold of 90% and a processing resource utilization threshold of 90%. In such a case, the security device 220 may identify the resource profile based on values of each of the one or more resource utilization metrics. For example, the security device 220 may determine a value of a memory resource utilization metric and a value of a processing resource utilization metric at the given time, and may use the values of the one or more resource utilization metrics to identify a resource profile associated with resource utilization thresholds or ranges that match both the memory utilization and the processing resource utilization.

In example 100, the security device 220 determines that a value of a memory utilization metric is 77%. Therefore, as indicated in FIG. 1, the security device 220 identifies the resource profile r_profile1 based on the value of the memory utilization metric associated with the security device 220 (e.g., since 75%<77%≤80%).

As shown by reference 104, the security device 220 may identify a security services profile to be applied to traffic that is to be processed by the security device 220. A security services profile is a profile that indicates one or more security services to be applied by the security device 220 based on one or more resource profiles.

In some implementations, the security services profile may be indicated by a security policy configured for the security device 220. The security policy may identify a set of characteristics that, if determined to be associated with a given traffic flow, cause the security device 220 to apply a particular security services profile to the traffic. For example, the security policy may indicate one or more source addresses (e.g., any source address), one or more destination addresses (e.g., any destination address), one or more applications (e.g., any application), and one or more dynamic applications (e.g., HTTP), a user associated with the traffic, or a role associated with the traffic (e.g., a role of a user associated with the traffic). In one example, the security policy is applicable to traffic from any source address to any source address for any application that uses HTTP.

In some implementations, if the security device 220 determines that characteristics of a given traffic flow match a set of characteristics associated with a configured security policy, then the security device 220 may determine that the security device 220 is to apply a security services profile associated with the security policy. Thus, in some implementations, the security device 220 may identify the security services profile based on a characteristic associated with the traffic, such as a source address associated with the traffic, a destination address associated with the traffic, an application associated with the traffic, a dynamic application associated with the traffic, an application type associated with the traffic, a user associated with the traffic, or a role associated with the traffic, among other examples.

In example 100, the security device 220 identifies a security services profile ss_profile1 to be applied to the traffic based on characteristics of the traffic. Further example details of the security services profile ss_profile1 are provided below.

As shown by reference 106, the security device 220 may determine a set of security services to be performed by the security device, where the set of security services is identified based on the resource profile and the security services profile.

In some implementations, the security services profile may indicate a set of security services that is to be performed when a given resource profile is determined to be applicable to the security device 220. For example, the security services profile may indicate that a first set of security services (e.g., an AAMW service, an IDP service, a UTM service, and a DNSF service), is to be performed when a first resource profile (e.g., r_profile1 associated with a 75% memory utilization threshold) is applicable to the security device 220, that a second set of security services (e.g., the AAMW service, the IDP service, and the DNSF service) is to be performed when a second resource profile (e.g., r_profile2 associated with an 80% memory utilization threshold) is applicable to the security device 220, and that a third set of security services (e.g., the IDP service and the DNSF service) is to be performed when a third resource profile (e.g., r_profile3 associated with an 85% memory utilization threshold) is applicable. Further, in some implementations, the security services profile may indicate a default set of security services (e.g., the AAMW service, the IDP service, the UTM service, the DNSF service, and a security intelligence service) that is to be performed when a default resource profile (e.g., r_profiledefault) is applicable. Notably, in this example, the quantity of security services to be performed decreases as the memory utilization thresholds associated with the resource profiles increases. Thus, as memory utilization of the security device 220 increases, the security services profile may be configured so that the security device 220 performs, for example, only higher priority security services (rather than both higher and lower priority security services).

In some implementations, the security services profile may include a service rule associated with a security service of the set of security services. The service rule may indicate a rule based on the service that is to be performed. For example, a first rule may indicate that, when a first resource profile (e.g., r_profile1) is applicable, caching is enabled for the UTM service to be performed by the security device 220. Conversely, a second rule may indicate that, when a second resource profile (e.g., r_profile2) is applicable, caching is disabled for the UTM service to be performed by the security device 220. In this way, a configuration for a given security service can vary with respect to resource profiles associated with the security services profile, thereby enabling service specific optimizations (e.g., per resource profile).

In example 100, the security device 220 identifies a set of security services that is to be performed as including the AAMW service, the IDP service, the UTM service (e.g., with caching according to a first service rule), and the DNSF service based on the security services profile ss_profile1 and the resource profile r_profile1.

As shown by reference 108, the security device 220 may perform the set of security services according to the security services profile. For example, the security device 220 may perform the AAMW service, the IDP service, the UTM service (e.g., with caching according to the first service rule), and the DNSF service for the traffic flow between the source device 210 and the destination device 230.

In some implementations, the security device 220 may repeat one or more of the operations described in association with FIG. 1 at a later time (e.g., on a periodic basis, based on user input, or the like). In this way, the security device 220 may dynamically adjust the set of security services performed by the security device 220 for the traffic based on resources available to the security device 220 for performing one or more security services. As a result, a degree to which network availability or security service bypassing occurs due to limited resources can be configured or controlled (e.g., as desired by a network operator), which provides improved network security and/or network availability in a given scenario.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
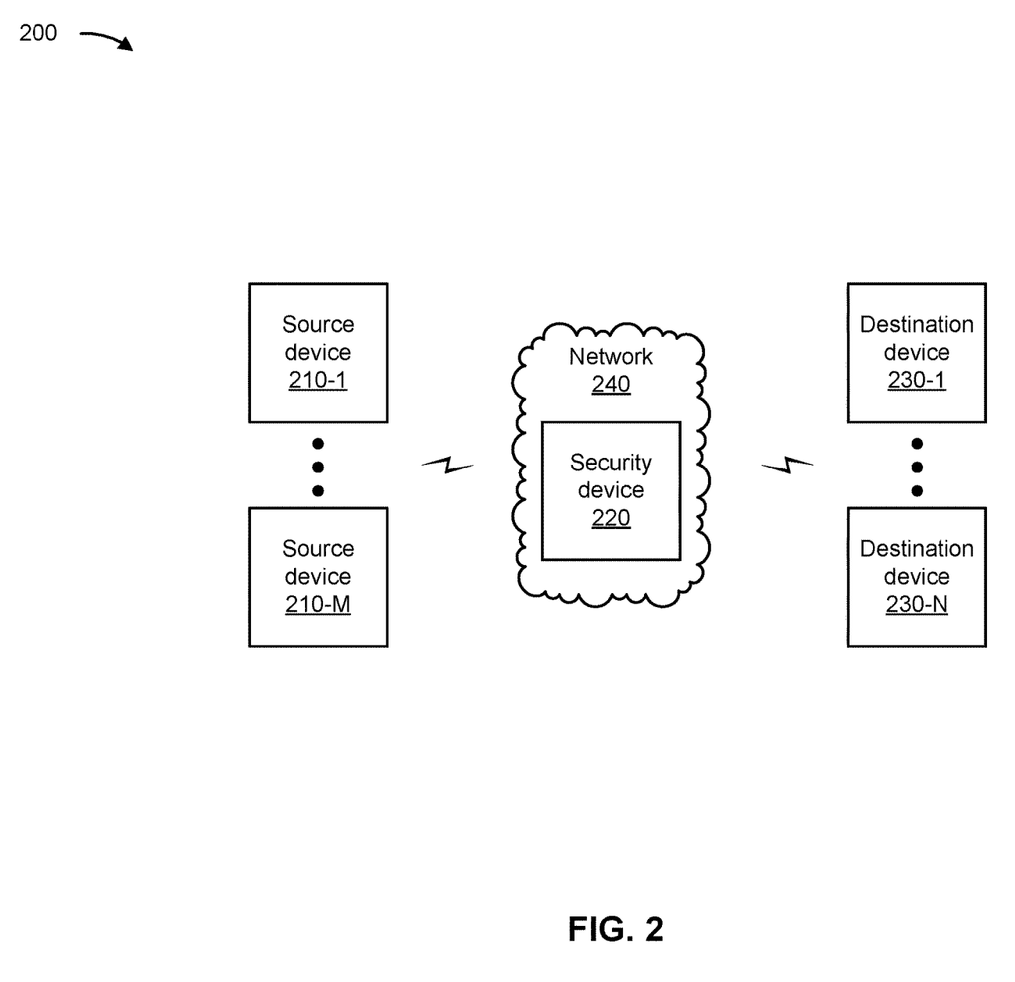
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more source devices 210 (shown as source device 210-1 through source device 210-M (M≥1)), a security device 220, one or more destination devices (shown as destination device 230-1 through destination device 230-N

(N≥1)), and a network 240. Devices of environment 200 may interconnect via wired connections, wireless connections, or a combination of wired and wireless connections.

Source device 210 includes one or more devices capable of receiving, generating, storing, processing, and/or providing information, such as information described herein. For example, source device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), or a similar type of device. In some implementations, source device 210 may receive network traffic from and/or may provide network traffic to other source devices 210, security device 220, and/or destination device 230, via network 240 (e.g., by routing packets using security device 220 as an intermediary).

Security device 220 includes one or more devices capable of receiving, processing, storing, routing, and/or providing traffic (e.g., a packet or other information or metadata) in a manner described herein. For example, security device 220 may include a router, such as a label switching router (LSR), a label edge router (LER), an ingress router, an egress router, a provider router (e.g., a provider edge router or a provider core router), a virtual router, or another type of router. Additionally, or alternatively, security device 220 may include a gateway, a switch, a firewall, a hub, a bridge, a reverse proxy, a server (e.g., a proxy server, a cloud server, or a data center server), a load balancer, and/or a similar device. In some implementations, security device 220 may be a physical device implemented within a housing, such as a chassis. In some implementations, security device 220 may be a virtual device implemented by one or more computer devices of a cloud computing environment or a data center. In some implementations, a group of security devices 220 may be a group of data center nodes that are used to route traffic flow through network 240.

Destination device 230 includes one or more devices capable of receiving, generating, storing, processing, and/or providing information, such as information described herein. For example, destination device 230 may include a laptop computer, a tablet computer, a desktop computer, a group of destination devices, or a similar type of device, associated with multicast traffic. In some implementations, destination device 230 may receive information from and/or transmit information (e.g., multicast traffic) to source device 210, via network 240 (e.g., by routing packets using security device 220 as an intermediary).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
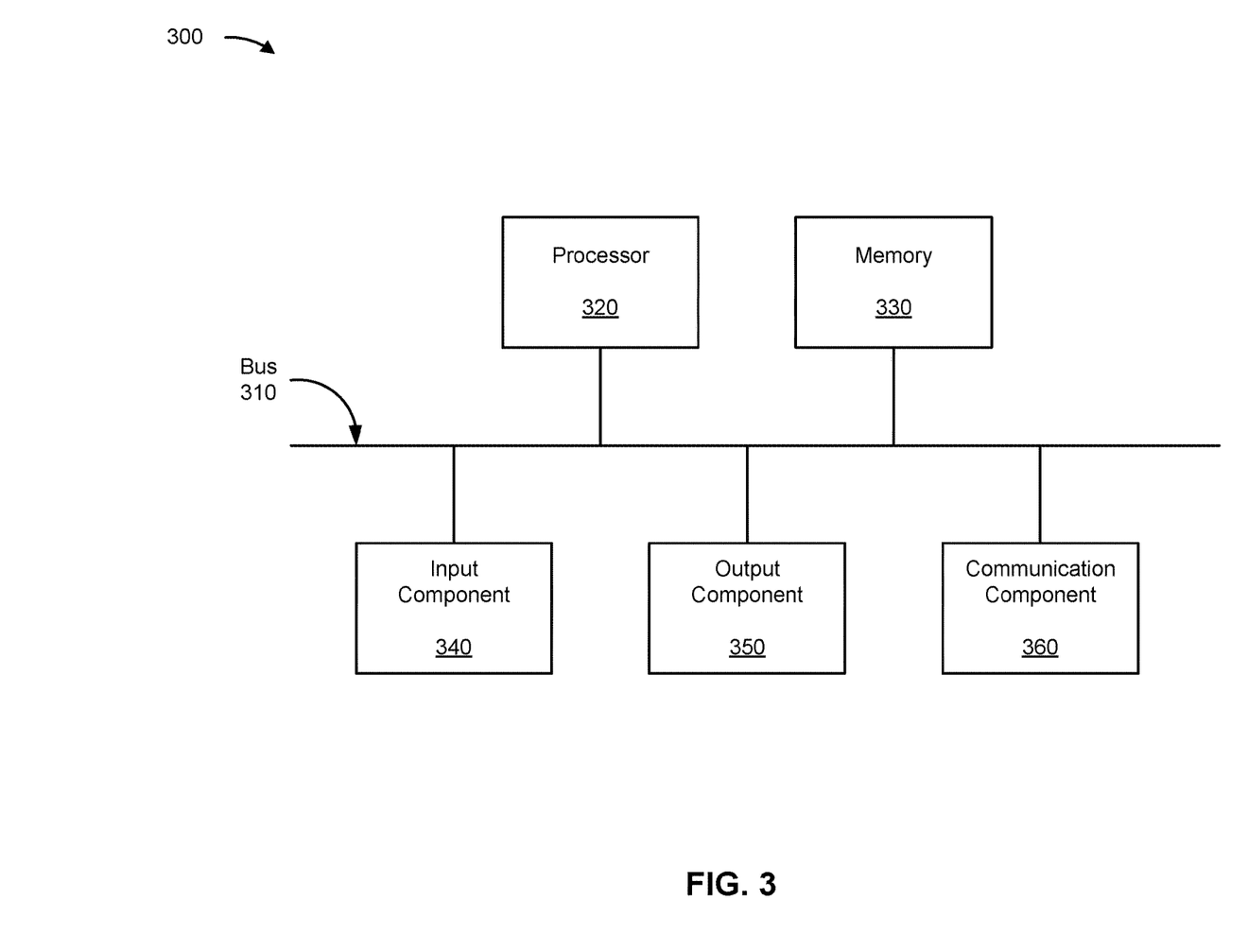
FIG. 3 is a diagram of example components of a device associated with adjusting a security policy based on system resource utilization.

FIG. 3 is a diagram of example components of a device 300 associated with adjusting a security policy based on system resource utilization. Device 300 may correspond to source device 210, security device 220, and/or destination device 230. In some implementations, source device 210, security device 220, and/or destination device 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
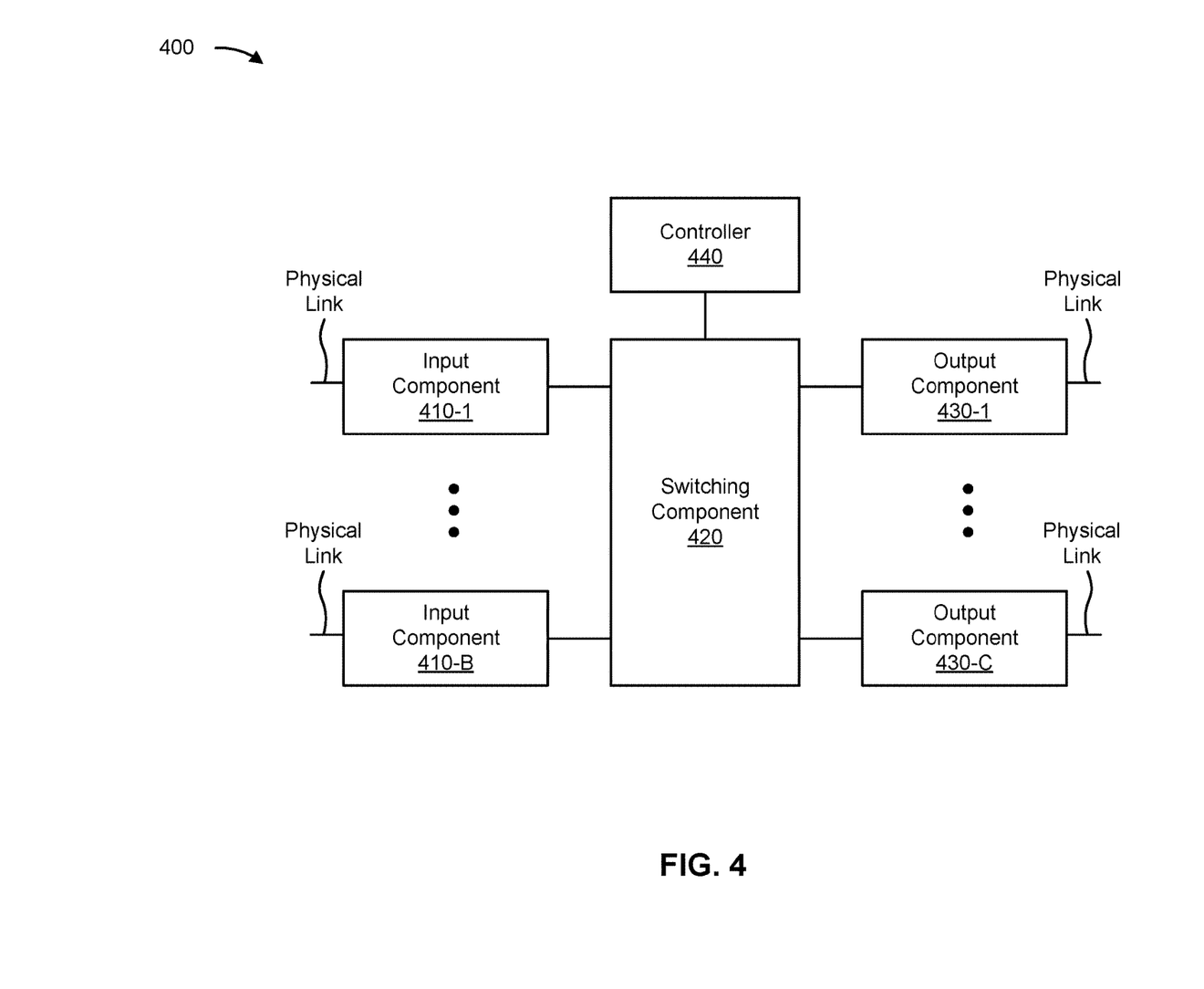
FIG. 4 is a diagram of example components of a device associated with adjusting a security policy based on system resource utilization.

FIG. 4 is a diagram of example components of a device 400 associated with adjusting a security policy based on system resource utilization. Device 400 may correspond to security device 220. In some implementations, security device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
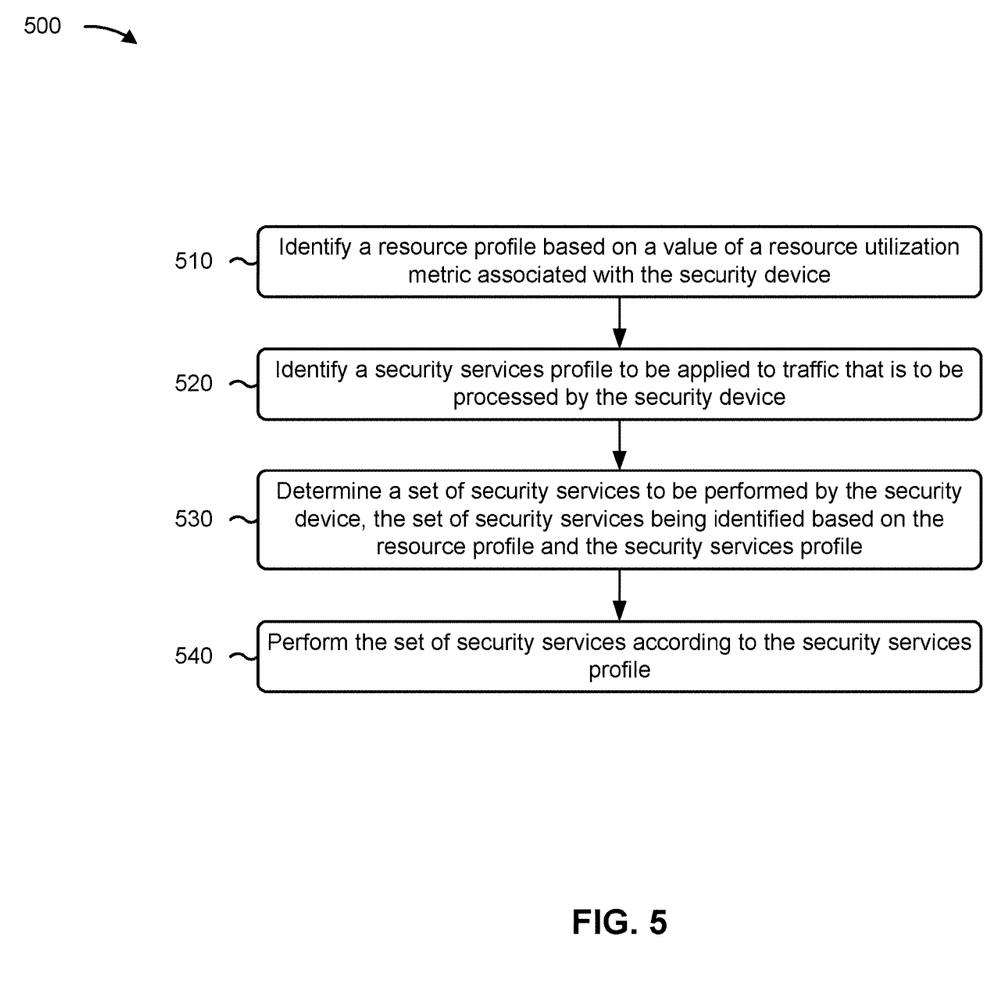
FIG. 5 is a flowchart of an example process associated with adjusting a security policy based on system resource utilization.

FIG. 5 is a flowchart of an example process 500 associated with adjusting a security policy based on system resource utilization. In some implementations, one or more process blocks of FIG. 5 are performed by a security device (e.g., security device 220). Additionally, or alternatively, one or more process blocks of FIG. 5 may be performed by one or more components of device 300 (e.g., processor 320, memory 330, input component 340, output component 350, and/or communication component 360) and/or by one or more components of device 400 (e.g., input component 410, switching component 420, output component 430, and/or controller 440).

As shown in FIG. 5, process 500 may include identifying a resource profile based on a value of a resource utilization metric associated with the security device (block 510). For example, the security device may identify a resource profile based on a value of a resource utilization metric associated with the security device, as described above.

As further shown in FIG. 5, process 500 may include identifying a security services profile to be applied to traffic that is to be processed by the security device (block 520). For example, the security device may identify a security services profile to be applied to traffic that is to be processed by the security device, as described above.

As further shown in FIG. 5, process 500 may include determining a set of security services to be performed by the security device, the set of security services being identified based on the resource profile and the security services profile (block 530). For example, the security device may determine a set of security services to be performed by the security device, the set of security services being identified based on the resource profile and the security services profile, as described above.

As further shown in FIG. 5, process 500 may include performing the set of security services according to the security services profile (block 540). For example, the security device may perform the set of security services according to the security services profile, as described above.

Process 500 may include additional implementations, such as any single implementation or any combination of implementations described below and/or in connection with one or more other processes described elsewhere herein.

In a first implementation, the resource utilization metric includes at least one of a memory utilization metric or a processing resource utilization metric.

In a second implementation, alone or in combination with the first implementation, the resource profile is associated with at least one of a memory utilization threshold or a processing resource utilization threshold.

In a third implementation, alone or in combination with one or more of the first and second implementations, the security services profile includes a service rule associated with a security service of the set of security services, wherein performing the set of security services comprises performing the security service according to the service rule.

In a fourth implementation, alone or in combination with one or more of the first through third implementations, the resource profile is a default resource profile.

In a fifth implementation, alone or in combination with one or more of the first through fourth implementations, the security services profile is identified based on at least one of a source address associated with the traffic, a destination address associated with the traffic, an application associated with the traffic, a dynamic application associated with the traffic, a user associated with the traffic, or a role associated with the traffic.

In a sixth implementation, alone or in combination with one or more of the first through fifth implementations, the resource profile is a first resource profile, the value of the resource utilization metric is a first value, and the set of security services is a first set of security services, and process 500 further comprises identifying a second resource profile based on a second value of the resource utilization metric associated with the security device, wherein the second value is different from the first value, determining a second set of security services to be performed by the security device, the second set of security services being identified based on the second resource profile and the security services profile, wherein the second set of security services is different from the first set of security services, and performing the second set of security services according to the security services profile.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by a security device, a first resource profile based on a value of a resource utilization metric associated with the security device;
   identifying, by the security device, a security services profile to be applied to traffic that is to be processed by the security device,
      wherein the security services profile includes a first service rule associated with the first resource profile and a second service rule associated with a second resource profile;
   determining, by the security device, a first set of security services to be performed by the security device, the first set of security services being identified based on the first resource profile and the security services profile;
   performing, by the security device, the first set of security services according to the security services profile; and
   dynamically adjusting, by the security device, the first set of security services to create a second set of security services based on identifying a second value of the resource utilization metric associated with the security device,
      wherein the resource utilization metric includes at least one of a memory utilization metric or a processing resource utilization metric, and
      wherein the second set of security services is different from the first set of security services; and
   performing, by the security device, the second set of security services according to the security services profile.

2. The method of claim 1, wherein the first resource profile is associated with at least one of a memory utilization threshold or a processing resource utilization threshold.

3. The method of claim 1, wherein the security services profile includes a service rule associated with a security service of the set of security services, wherein performing the set of security services comprises performing the security service according to the service rule.

4. The method of claim 1, wherein the first resource profile is a default resource profile.

5. The method of claim 1, wherein the security services profile is identified based on at least one of a source address associated with the traffic, a destination address associated with the traffic, an application associated with the traffic, a dynamic application associated with the traffic, a user associated with the traffic, or a role associated with the traffic.

6. The method of claim 1, wherein the value of the resource utilization metric is a first value, and the method further comprises:
   identifying the second resource profile based on a second value of the resource utilization metric associated with the security device,
      wherein the second value is different from the first value.

7. The method of claim 1, wherein the first service rule enables caching to be performed by the security device.

8. A security device, comprising:
   one or more memories; and
   one or more processors, coupled to the one or more memories, to execute stored instructions on the one or more memories, that cause the one or more processors to:
      identify a first resource profile based on a value of a resource utilization metric associated with the security device;
      identify a first set of security services to be performed by the security device, the first set of security services being identified based on the first resource profile;
      perform the identified set of security services, the set of security services being performed according to a security services profile that is to be applied to traffic that is to be processed by the security device;
      dynamically adjust the first set of security services to create a second set of security services based on identifying a second value of the resource utilization metric associated with the security device,
         wherein the resource utilization metric includes at least one of a memory utilization metric or a processing resource utilization metric, and
         wherein the second set of security services is different from the first set of security services; and
      perform the second set of security services according to the security services profile.

9. The security device of claim 8, wherein the first resource profile indicates at least one of a memory utilization threshold or a processing resource utilization threshold.

10. The security device of claim 8, wherein the security services profile includes a service rule associated with a security service of the set of security services,
   wherein the one or more processors, to perform the set of security services, are configured to perform the security service according to the service rule.

11. The security device of claim 8, wherein the first resource profile is a default resource profile.

12. The security device of claim 8, wherein the one or more processors are further configured to identify the security services profile based on at least one of a source address associated with the traffic, a destination address associated with the traffic, an application associated with the traffic, a dynamic application associated with the traffic, a user associated with the traffic, or a role associated with the traffic.

13. The security device of claim 8, wherein the value of the resource utilization metric is a first value, and the one or more processors are further configured to:
   identify a second resource profile based on a second value of the resource utilization metric associated with the security device,
      wherein the second value is different from the first value.

14. The security device of claim 8, wherein the first resource profile enables service specific optimizations.

15. A non-transitory computer-readable medium storing a set of instructions, the set of instructions comprising:
   one or more instructions that, when executed by one or more processors of a device, cause the device to:
      identify a first resource profile based on a value of a resource utilization metric associated with the device;
      identify a services profile to be applied to traffic that is to be processed by the device,
         wherein the services profile is associated with the first resource profile and a second resource profile;

determine a first set of services to be performed by the device, the first set of services being identified based on the first resource profile and the services profile;

perform the first set of services according to the services profile;

dynamically adjust the first set of security services to create a second set of security services based on identifying a second value of the resource utilization metric associated with the device,
  wherein the resource utilization metric includes at least one of a memory utilization metric or a processing resource utilization metric, and
  wherein the second set of security services is different from the first set of security services; and perform the second set of security services according to the services profile.

16. The non-transitory computer-readable medium of claim 15, wherein the second resource profile indicates at least one of a memory utilization threshold or a processing resource utilization threshold.

17. The non-transitory computer-readable medium of claim 15, wherein the services profile includes a first service rule associated with a first service of the first set of services, wherein the one or more instructions, that cause the device to perform the first set of services, cause the device to perform the service according to the first service rule.

18. The non-transitory computer-readable medium of claim 15, wherein the first resource profile is a default resource profile.

19. The non-transitory computer-readable medium of claim 15, wherein the services profile is identified based on at least one of a source address associated with the traffic, a destination address associated with the traffic, an application associated with the traffic, a dynamic application associated with the traffic, a user associated with the traffic, or a role associated with the traffic.

20. The non-transitory computer-readable medium of claim 15, wherein a quantity of security services, in the set of security services, to be performed decreases as resource utilization thresholds associated with one or more of the first resource profile or the second resource profile increases.

* * * * *